United States Patent [19]

Fitzpatrick

[11] Patent Number: 4,901,574

[45] Date of Patent: Feb. 20, 1990

[54] RESILIENCE TESTING

[75] Inventor: Ian Fitzpatrick, Selby, Australia

[73] Assignee: A.P.D. Snack Foods Pty Limited, Sydney, Australia

[21] Appl. No.: 278,960

[22] Filed: Dec. 2, 1988

[30] Foreign Application Priority Data

Dec. 8, 1987 [AU] Australia .................................. PI5797

[51] Int. Cl.$^4$ .............................................. G01N 29/00
[52] U.S. Cl. ............................................ 73/579; 73/52
[58] Field of Search ................. 73/579, 574, 573, 651, 73/652, 649, 49.3, 45.4, 52; 209/599, 699

[56] References Cited

U.S. PATENT DOCUMENTS 2,695,517 11/1954 Wiggins .................................. 73/574
4,373,396 2/1983 Johnson .................................. 73/651
4,671,101 6/1987 Franklin .................................. 209/599

Primary Examiner—John Chapman
Assistant Examiner—Louis M. Arana
Attorney, Agent, or Firm—Robbins & Laramie

[57] ABSTRACT

This invention concerns a resilience testing gauge and a resilience testing system, which includes the gauge, suitable for testing the seal quality of partly inflated bags. This invention also concerns a method of testing the seal quality of partly inflated bags using the resilience testing gauge. The gauge employs a first (2) and a second (3) beam cantilevered from a rigid block (4). In use the rigid block (4) is vibrated and one of the beams (3) is brought into contact with the article under test. The phase responses of the two beams (2 and 3) then provide information from which the test results can be determined.

13 Claims, 3 Drawing Sheets

RESILIENCE TESTING

This invention concerns a resilience testing gauge and a resilience testing system, which includes the gauge, suitable for testing the seal quality of partly inflated bags, and also, a method of testing the seal quality of partly inflated bags using the resilience testing gauge.

In the food packaging industry snack foods are often sealed along with a quantity of air inside bags. In such packaging it is important to close the bag with an airtight seal in order to preserve and protect the product contained. Testing the integrity of the bag seals has, in the past, either been carried out manually, with operators handling every package, or by using devices which measure the size of the overall package.

The manual method of testing is labor intensive and highly sensitive to individual operator technique and thoroughness. Checking the dimensions of the sealed bags is often adequate in cases where the bags are well inflated, but is not suitable in cases where the bags are poorly inflated or contain a product that tends to partially support the packaging material, such as potato chips.

According to a first aspect of the present invention there is provided a resilience testing gauge comprising:

first and second beams cantilevered from a rigid block;

means for exciting the rigid block at a selected constant frequency such that the beams are caused to vibrate;

detecting means for detecting the dynamic phase response of each beam when the first beam is allowed to vibrate freely and a second beam is brought into contact with an article to be tested; and output means for outputting an indication of the relative dynamic phase response of the beams with respect to each other.

Preferably the detecting means comprise strain gauges attached to each beam; alternatively accelerometers may be used. Advantageously said means for exciting comprises an eccentrically loaded member rotatably attached to the rigid block.

According to a second aspect of the present invention there is provided a resilience tester suitable for testing the seal quality of partly inflated bags including:

a resilience testing gauge comprising first and second beams cantilevered from a rigid block;

means for exciting the rigid block at a selected constant frequency such that the beams are caused to vibrate;

detecting means for detecting the dynamic phase response of each beam when the first beam is allowed to vibrate freely and the second beam is brought into contact with an article to be tested; and output means for outputting an indication of the relative dynamic phase response of the beams with respect to each other.

The system may also include feeding means for feeding articles to be tested past said second beam; and compression means for compressing the articles to be tested at least during the time they are in contact with the second beam.

Preferably said rigid block is pivoted to rotate so that a measurement of the displacement of the first beam provides an indication of the thickness of the bag under test. Advantageously, when the means for exciting comprises an eccentrically loaded member it is driven by a motor via pulley system one pulley of which is mounted on the axis about which the rigid block is pivoted to rotate.

Also advantageously the compression means comprise an upper and lower conveyor, the upper of which has two parallel belts separated by a gap; the belts possibly being slotted transversely for part of their width to form tongues, and the second beam of the resilience testing gauge being applied through the slots between the two belts onto the bags as they pass by.

According to a third asPect of the present invention there is provided a resilience testing method suitable for testing the seal quality of partly inflated bags comprising the steps of:

compressing a bag by an amount not sufficient to damage the seal or contents;

feeding the bag on a conveyor past a second beam of a gauge comprising a first and second beam cantilevered from a rigid block;

exciting the rigid block as a selected constant frequency such that the beams are caused to vibrate;

detecting the dynamic phase response of each beam;

integrating the responses over the time period the bag is in contact with said second beam, and integrating the responses over the time during this Period which the first and second beams vibrate out of phase;

comparing the resulting ratio with a pre-set level; and outputting a result of the comparison.

Preferably the bags are compressed between an upper and lower conveyor.

The method has the advantages of automation, and because the test is non-destructive every bag Produced may be tested if required.

The invention will now be described by way of example only with reference to the accompanying drawings in which.

Figure 1:
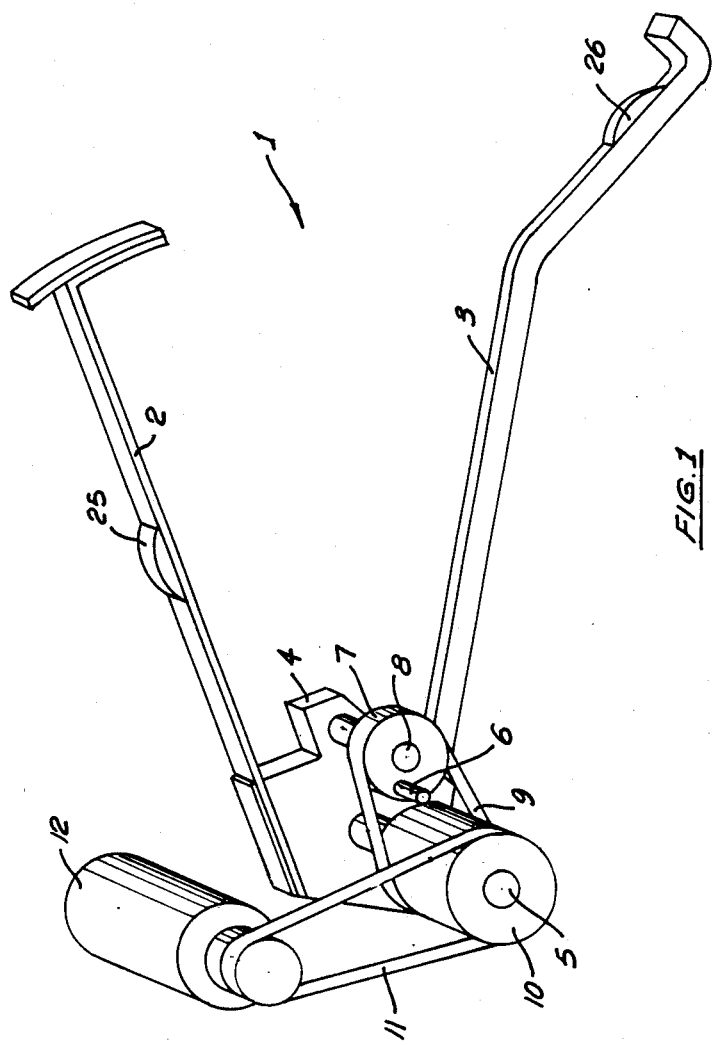
FIG. 1 is a preferred embodiment of a resilience testing gauge according to the invention.

Referring now to FIG. 1 the gauge 1 comprises a first beam 2 and a second beam 3 cantilevered from a rigid block 4. Block 4 is pivotally suspended from axle 5 about which it is free to rotate. An eccentric weight 6 is mounted on pulley 7 which is mounted on axle 8. A first belt 9 connects pulley 7 to a second pulley 10 which is in turn connected by a second belt 11 to a motor 12. The second pulley 10 rotates about axle 5 on which it is mounted on bearings to allow free rotation without imparting movement to the axle. Axle 5 penetrates and is secured to rigid block 4. Both ends of axle 5 are mounted in bearings (not shown), allowing block 4 to rotate between limits.

The operation of the resilience gauge will now be described. Rigid block 4 is caused to vibrate at a selected frequency by rotation of the eccentric weight 6. The frequency of rotation is determined by appropriate gearing, constituted by the pulley system, connected from the drive motor 12 and block 4. This vibration causes both beams 2 and 3 to vibrate. The first beam 2 is free to vibrate, however the lower, active, beam 3 is brought into contact with an article to be tested. Strain gauges 25 and 26, or other vibration measurement devices, such as accelerometers, are fitted to both beams thus allowing their dynamic phase responses to be measured.

An article in contact with the lower beam 3 acts as a spring-damper assembly and has a particular characteristic which causes the beams to vibrate with a particular phase relationship. Should the resilience of the article be altered its characteristic will be altered and the beams, as a result, will vibrate with a different phase relationship.

A microprocessor system may be used to monitor the dynamic phase responses of both beams when an article is under test. From the relationship between the responses of the two beams an output indicating the resilience of the article under test may be generated.

Figure 2:
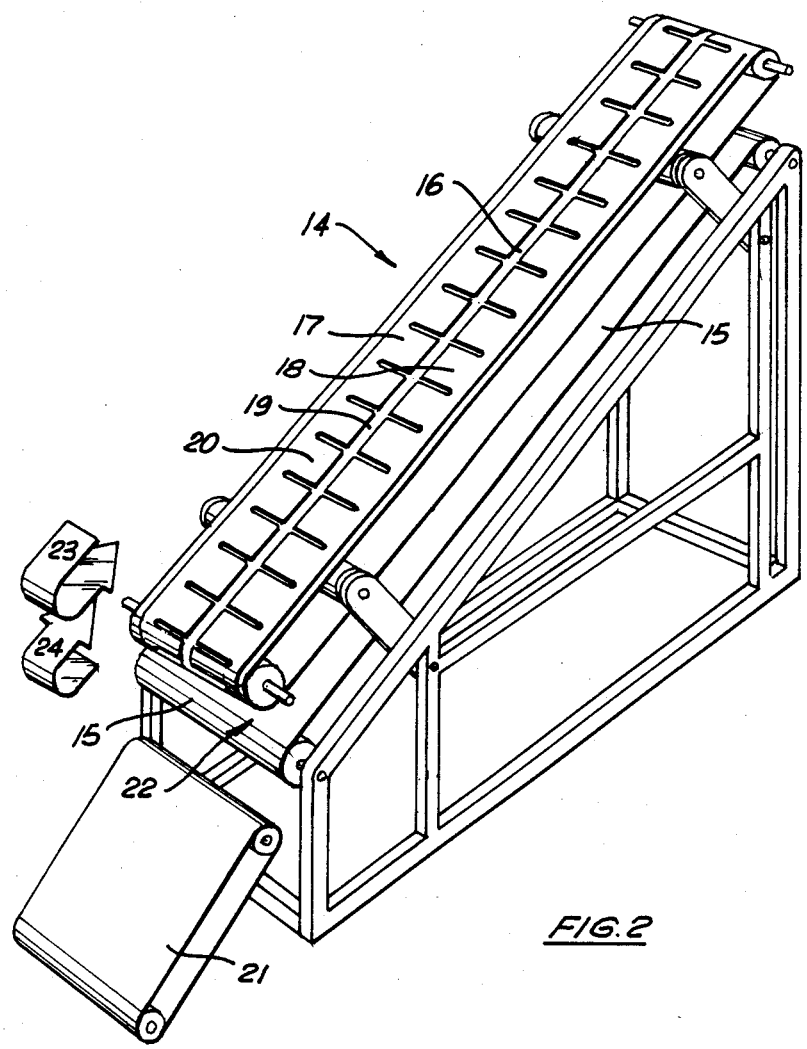
FIG. 2 is part of a seal testing system suitable for use according to the invention.

Referring now to FIG. 2 the bag seal testing system 14 comprises an inclined belt conveyor 15 which transports bags past the active beam of a resilience gauge located in a region 16. Two parallel belts 17 and 18 separated by a gap 19 are mounted over the conveyor 15. The parallel belts 17 and 18 are slotted transversely for part of their width in order to form tongues such as 20. A feed belt 21 feeds bags to the inlet 22 between the conveyor 15 and the pair of belts 17 and 18.

Both the belts and the conveyor are arranged to have the same surface speed and are driven in the directions shown by the arrows 23 and 24. The belts are arranged so that their height above the main conveyor is adjustable by a hand wheel. The height is adjusted for particular types and sizes of bag such that as the bags pass under the belts the tongues 20 are deflected. The tongues 20 thus compress the bags so that they bulge out from the gap 19 between the belts. A resilience testing gauge 1 is mounted over the compression assembly with its active beam protruding through the gap between the belts. As the bags are carried up conveyor 15 the active beam of the gauge rises over the leading edge of the bag and rides along the bulge formed between the belts. This allows the resilience test to be performed.

Figure 3:
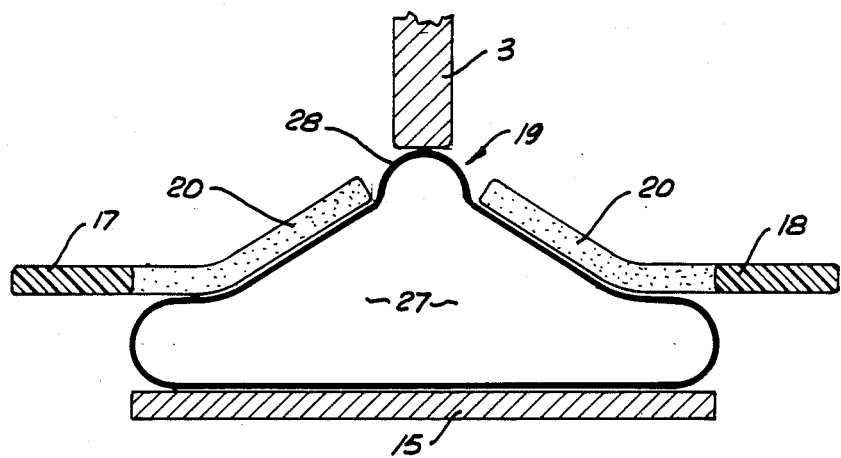
FIG. 3 a cross-sectional view showing a bag being tested in the part system indicated in FIG. 2 using the gauge shown in FIG. 1.

Referring now to FIG. 3 the operation of the bag seal testing system will now be described.

A bag 27 is fed from the feed conveyor 21 into the entrance 22 of the transport conveyor 15 and is gripped between that conveyor and the belts 17 and 18, being lightly compressed by the tongues 20 such that a portion 28 of the bag bulges out between opposing pair of tongues 20. The comPressed bag is carried up the conveyor 15 and past the active beam 3 of a resilience gauge before finally being ejected from the top of the apparatus. The bag, if it Passes the resilience test, is subsequently packed and shipped. However, if the bag fails the test it is rejected.

The system as a whole is "tuned" to a given product by adjusting the frequency of the oscillations imparted to the gauge, the degree of bag compression and the level at which a bag is deemed to fail the quality control test.

In this way the beams may be caused to vibrate out of phase when the bag under test is correctly sealed. Should the bag under test be incorrectly sealed the beams vibrate in-phase.

The phase responses of both arms of the resilience gauge are measured over the length of each bag and integrated, both over the time which they vibrate out of phase, and over the total time which the active beam 3 is in contact with each bag. From this a ratio in respect of each bag may be established, that is, the ratio of the amount of time out of phase to the amount of time on the bag.

The resulting ratio is then compared with a pre-set level. If the result falls below that prescribed the bag may be rejected. If the result is above the prescribed level the quality of the seal may be taken as being satisfactory.

In addition, the system as a whole can measure the length of any particular bag from the time it takes to pass by the resilience gauge. It follows that an accumulative average bag length may also be monitored. The system may be arranged to reject bags that either are excessively long or short.

Advantageously a check of the bag thickness may also be carried out by monitoring the amount by which each bag causes the gauge to rotate about its pivoting axis 5. This is conveniently done with opto-electronic sensors stationed around the elongate shaped end of the first beam 2. This allows bags which do not appear to have sufficient bulk to also be rejected.

It should be appreciated that the contents of the bags are of no consequence as long as the bags demonstrate some resilience due to their part-gaseous contents. The bags must demonstrate a sufficient degree of resilience to enable testing by the gauge when the bags are slightly compressed.

An alternative to the use of strain gauges is to use some form of accelerometer. This may even be preferred since strain gauges and the bonds which secure them to the beams of the resilience testing gauge are subject to degradation.

Other optional features of the resilience gauge may include damping of the two cantilevered beams, for instance by mounting pads of foam tape in contact with them. Also the rotational movement of the gauge assembly may be resisted by some form of tension arrangement. It should also be appreciated that many other ways of vibrating the gauge assembly are possible and would be within the scope of the present invention.

I claim:

1. A resilience testing gauge comprising:
   first and second beams cantilevered from a rigid block;
   means for exciting the rigid block at a selected constant frequency such that the beams are caused to vibrate;
   detecting means for detecting the dynamic phase response of each beam when the first beam is allowed to vibrate freely and a second beam is brought into contact with an article to be tested; and
   output means for outputting an indication of the relative dynamic phase response of the beams with respect to each other.

2. A resilience testing gauge as claimed in claim 1, wherein the detecting means comprise strain gauges attached to each beam.

3. A resilience testing gauge as claimed in claim 1 wherein the detecting means comprise accelerometers attached to each beam.

4. A resilience testing gauge as claimed in claim 1 wherein said means for exciting comprises an eccentrically loaded member rotatably attached to the rigid block.

5. A resilience tester suitable for testing the seal quality of partly inflated bags including a resilience testing gauge comprising:

first and second beams cantilevered from a rigid block;

means for exciting the rigid block at a selected constant frequency such that the beams are caused to vibrate;

detecting means for detecting the dynamic phase response of each beam when the first beam is allowed to vibrate freely and a second beam is brought into contact with an article to be tested; and output means for outPutting an indication of the relative dynamic phase response of the beams with respect to each other.

6. A resilience tester as claimed in claim 5, also including feeding means for feeding articles to be tested past said second beam.

7. A resilience testing gauge as claimed in claim 5 also including compression means for compressing the articles to be tested at least during the time they are in contact with the second beam.

8. A resilience testing gauge as claimed in claim 5 wherein said rigid block is pivoted to rotate so that a measurement of the displacement of the first beam provides an indication of the thickness of the bag under test.

9. A resilience testing gauge as claimed in claim 5 wherein the eccentrically loaded member is driven by a motor in a pulley system one pulley of which is mounted on an axis about which the rigid block is pivoted to rotate.

10. A resilience testing gauge as claimed in claim 7 wherein the compression means comprise an upper and lower conveyor.

11. A resilience testing gauge as claimed in claim 10 wherein the upper conveyor has two parallel belts separated by a gap, the belts being slotted transversely for part of their width to form tongues, and the second beam of the resilience testing gauge being applied through the slots between the two belts onto the bags as they pass by.

12. A resilience testing method suitable for testing the seal quality of partly inflated bags comprising the steps of:

compressing a bag by an amount not sufficient to damage the seal or contents;

feeding the bag on a conveyor past a second beam of a gauge comprising a first and second beam cantilevered from a rigid block;

exciting the rigid block at a selected constant frequency such that the beams are caused to vibrate;

detecting the dynamic phase response of each beam;

integrating the responses over the time period the bag is in contact with said second beam, and integrating the responses over the time during this period in which the first and second beams vibrate out of phase;

comparing the resulting ratio with a pre-set level; and outputting a result of the comparison.

13. A resilience testing method as claimed in claim 12 wherein the bags are compressed between an upper and lower conveyor.

* * * * *